United States Patent
Loncar et al.

(10) Patent No.: US 10,205,274 B2
(45) Date of Patent: Feb. 12, 2019

(54) ELECTRONIC CONNECTION ARRANGEMENT

(71) Applicant: Yazaki Europe Ltd, Hertfordshire (GB)

(72) Inventors: Zelimir Loncar, Sesvete-Zagreb (HR); Goran Petrovic-Poljak, Zagreb (HR); Ozren Milazzi, Zagreb (HR); Tomislav Svraka, Velika Gorica (HR)

(73) Assignee: YAZAKI EUROPE LTD., Hertfordshire (GB)

( * ) Notice: Subject to any disclaimer, the term of this patent is extended or adjusted under 35 U.S.C. 154(b) by 0 days.

(21) Appl. No.: 15/948,429

(22) Filed: Apr. 9, 2018

(65) Prior Publication Data

US 2018/0294600 A1 Oct. 11, 2018

(30) Foreign Application Priority Data

Apr. 11, 2017 (EP) ..................................... 17166096

(51) Int. Cl.

| H01R 13/04 | (2006.01) |
| H01R 13/621 | (2006.01) |
| H01R 4/56 | (2006.01) |
| H01R 13/52 | (2006.01) |
| H01R 13/631 | (2006.01) |
| H01R 13/44 | (2006.01) |

(52) U.S. Cl.
CPC ............. *H01R 13/621* (2013.01); *H01R 4/56* (2013.01); *H01R 13/5213* (2013.01); *H01R 13/631* (2013.01); *H01R 13/44* (2013.01)

(58) Field of Classification Search
CPC .................................................... H01R 13/44
USPC ......................................... 439/306, 693, 784
See application file for complete search history.

(56) References Cited

U.S. PATENT DOCUMENTS

| 2,742,622 | A | | 4/1956 | Stevens, Jr. | |
| 6,113,436 | A | * | 9/2000 | Kuwahara | H01R 13/44 |
| | | | | | 439/693 |
| 8,734,191 | B2 | * | 5/2014 | Zhao | H01R 13/44 |
| | | | | | 439/500 |

(Continued)

FOREIGN PATENT DOCUMENTS

| EP | 2 034 566 A2 | 3/2009 | |
| EP | 2 579 395 A2 | 4/2013 | |
| EP | 3136511 A2 * | 3/2017 | ............. H01R 13/44 |

*Primary Examiner* — Tho D Ta
(74) *Attorney, Agent, or Firm* — Sughrue Mion, PLLC

(57) ABSTRACT

An electrical connection arrangement including a male connector and a female connector both to be mated in mating directions along a longitudinal axis. The male connector has a pin element projecting in a first mating direction towards the female connector, a first protective cover on the pin element covering at least a free axial tip end of the pin element, and a protective element surrounding, at least partially, the pin element in a radial distance thereto. The female connector includes a nut element with a central threaded bore and projecting in a second mating direction towards the male connector, and a second protective cover on the nut element covering a free axial tip end of the nut element. The pin element has an outer thread and is threaded into the treaded bore of the nut element in a mated condition of the electrical connection arrangement establishing an electrical connection between the pin element and the nut element.

15 Claims, 3 Drawing Sheets

(56) References Cited

U.S. PATENT DOCUMENTS

| | | |
|---|---|---|
| 9,048,551 B2 | 6/2015 | Picaud et al. |
| 2009/0075525 A1 | 3/2009 | Gaidosch |
| 2013/0059482 A1* | 3/2013 | Flachslaender ........ H01R 13/44 439/682 |
| 2016/0064849 A1 | 3/2016 | Eckel |

* cited by examiner

ELECTRONIC CONNECTION ARRANGEMENT

BACKGROUND OF THE INVENTION

Field of the Invention

The invention relates to an electrical connection arrangement comprising a female connector and a male connector both to be mated in a mating direction along a longitudinal axis. The male connector comprises a pin element projecting in the mating direction towards the female connector, a first protective cover on the pin element covering at least a free axial tip end of the pin element, and at least one first protective element surrounding, at least partially, the pin element in a radial distance thereto.

Background

Such an electrical connection arrangement is described in US 2016/0064849 A1 which is, for example, used for a traction battery powering the traction battery of an electrical or hybrid vehicle. In these cases large voltages have to be transmitted via the electrical connection arrangements. Due to the fact that the conductive elements of the electrical connection arrangements are connected to high voltage batteries it is essential to avoid that a person unintentionally comes into contact with conductive elements. In order to comply also with corresponding standards it is necessary that the conductive elements are protected by insulations to such an extent that a human finger cannot pass through the insulation touching current-carrying elements.

Another electrical connector is described in U.S. Pat. No. 9,048,551 B2 showing a two pole male connector having screws for connecting a cable lug to a threaded terminal. The male connector is protected to avoid an unintentional touch of a human finger to energized elements of the connector. The header is not protected. The screws do not have a protective cover on the tip ends neither protective elements surrounding the screws.

Object of the invention is to provide an electrical connection arrangement having a safe finger touch protection and which has a simple and cost efficient design.

SUMMARY OF THE INVENTION

The object is achieved by an electrical connection arrangement comprising a female connector and a male connector both to be mated in a mating direction along a longitudinal axis. The male connector comprises a pin element projecting in the mating direction towards the female connector, a first protective cover on the pin element covering at least a free axial tip end of the pin element, and at least one first protective element surrounding, at least partially, the pin element in a radial distance thereto. The female connector comprises a nut element with a central threaded bore, said nut element projects in the mating direction towards the male connector, and a second protective cover on the nut element covering a free axial tip end of the nut element. The pin element has an outer thread and is threaded into the treaded bore of the nut element in a mated condition of the electrical connection arrangement establishing an electrical connection between the pin element and the nut element.

The electrical connection arrangement provides both a finger touch protected female connector and a finger touch protected male connector. Further, the pin element is threaded into the threaded bore of the nut element establishing a reliable connection between the male connector and the female connector. It is not necessary to provide further primary connection assurance elements.

In one embodiment of the invention, the male connector comprises a first contact element in electrical contact to the pin element. The female connector can comprise a second contact element in electrical contact to the nut element, wherein in a mated condition of the electrical connection arrangement the first contact element and the second contact element are in electrical contact to each other. The first contact element and the second contact element can be clamped in contact to each other by the pin element and the nut element which are axially supported against the first contact element and the second contact element, respectively.

The pin element, the nut element, the first contact element and/or the second contact element may be made of a metal material.

In an embodiment of the invention, the first contact element may have an annular portion arranged coaxially to the pin element. Preferably, in a projection of an axis of the pin element, i.e. viewed in direction of the axis of the pin element, the annular portion first contact element is arranged radially outwardly of the outer circumference of the pin element and also radially outwardly of the at least one protective element. The annular portion first contact element may be arranged axially offset to the pin element and/or to the at least one protective element.

The second contact element can be provided with an annular portion arranged coaxially to the nut element. In a projection of an axis of the nut element, i.e. viewed in direction of the axis of the nut element, the annular portion of the second contact element may be arranged radially outwardly of the nut element and may also be arranged radially outwardly of the second protective cover. The annular portion of the second contact element may be arranged axially offset to the nut element and/or to the second protective cover.

In one embodiment of the invention the male connector comprises a first protective housing accommodating the pin element and the first contact element.

The female connector may comprise a second protective housing accommodating the nut element and the second contact element.

The threaded bore of the nut element may be arranged such that it opens into the free tip end of the nut element wherein the second protective cover has an opening aligned with the threaded bore. Hence, it is possible to pass the pin element through the opening of the second protective cover in order to enable to thread the pin element into the threaded bore. The opening is adapted such that it is not possible to reach through the opening with a human finger touching the nut element.

In a preferred embodiment the pin element is arranged axially offset in a backward direction relative to the at least one protective element. Preferably, the axial offset is adapted such that it is impossible to reach the pin element with a human finger.

The first protective housing may have a first based portion and a first collar portion, wherein said first collar portion projects from the first base portion in longitudinal direction towards the female connector farther than the pin element. Accordingly, the pin element and the first contact element are encapsulated within the first collar portion in order to provide a further finger touch protection.

The first base portion may accommodate a connection portion of a male connector busbar wherein the pin element is axially supported against the connection portion of a male connector busbar. The male connector busbar may further be in contact with the first contact element. Alternatively, the connector busbar may be integral with the first contact element.

In an embodiment the pin element has a head portion received within a receiving chamber of the first protective housing, wherein the first protective housing has a tool opening for inserting a tool to reach the head portion. The head portion may be provided with connection means in order to connect a tool to the head portion so that the pin element may be threaded into the threaded bore using the tool.

In an embodiment the second protective housing has a second base portion and a second collar portion, wherein said second collar portion projects, at least partially in circumferential direction, from the second base portion in longitudinal direction farther than the nut element. Hence, the nut element and the second contact element are, at least partially, encapsulated by the second collar portion in order to provide a further touch protection.

The second base portion may accommodate a connection portion of a female connector busbar wherein the nut element is axially supported against the connection portion of the female connector busbar.

The second contact element may be in electrical contact to the female connector busbar or may be integral with the connection portion of the female connector busbar.

The second protective cover may have a plurality of ribs extending parallel to the longitudinal axis partially covering the outer circumference of the nut element. The ribs project in a radial direction from the nut element forming slots between adjacent ribs.

In an embodiment, a plurality of said protective elements may be provided which are distributed around the pin element and arranged parallel to the pin element.

The at least one protective element may extend through holes in the connection portion of the male connector busbar. In an embodiment, the connection portion of the male connector busbar is over-molded with synthetic resin forming the first protective housing. The protective elements can be an integral part of the first protective housing, as well as the first base portion and the first collar portion.

The second protective housing may be over-molded onto the connection portion of the female connector busbar and onto the nut element. The second protective cover may be over-molded onto the nut element. The second protective cover can be separate from the second protective housing.

The ribs of the second protective cover and the plurality of protecting elements may be adapted in such way that when mating the male connector with the female connector the ribs enter into slots between adjacent protective elements and the protective elements engage between slots between adjacent ribs.

In a preferred embodiment the electrical connection arrangement can be brought in a pre-set condition wherein the ribs of the second protective cover are axially engaging into slots formed between the protective elements, wherein the first contact element is distanced from the second contact element and wherein the first protective cover on the pin element is in insulating contact to the tip end of the nut element.

The electrical connection arrangement may further be adapted such that in a fully mated condition the ribs of the second protective cover axially engaging into slots formed between the protective elements, the first contact element is in electrical contact to the second contact element and the pin element is threaded into the central thread of the nut element.

Preferably, the first protective cover, the at least first protective elements, the first protective housing, the second protective cover and/or the second protective housing are made of an electrical insulating material such as a synthetic resin material.

BRIEF DESCRIPTION OF THE DRAWINGS

The invention will now be described by way of example with reference to the accompanying figures, wherein.

DETAILED DESCRIPTION OF THE INVENTION

Figure 1:
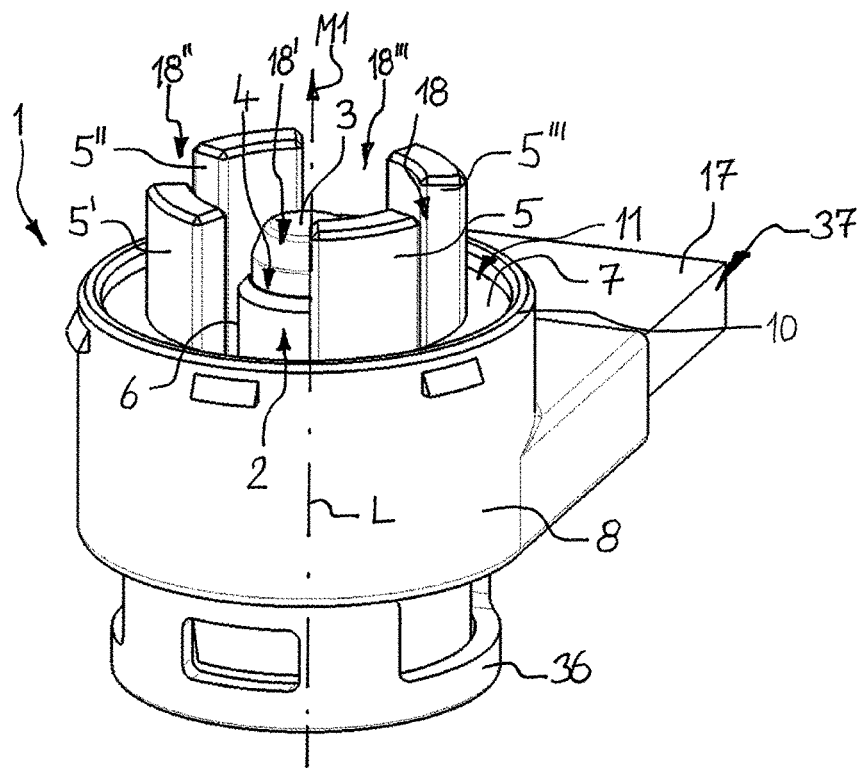
FIG. 1 is a first perspective view of a male connector.
Figure 2:
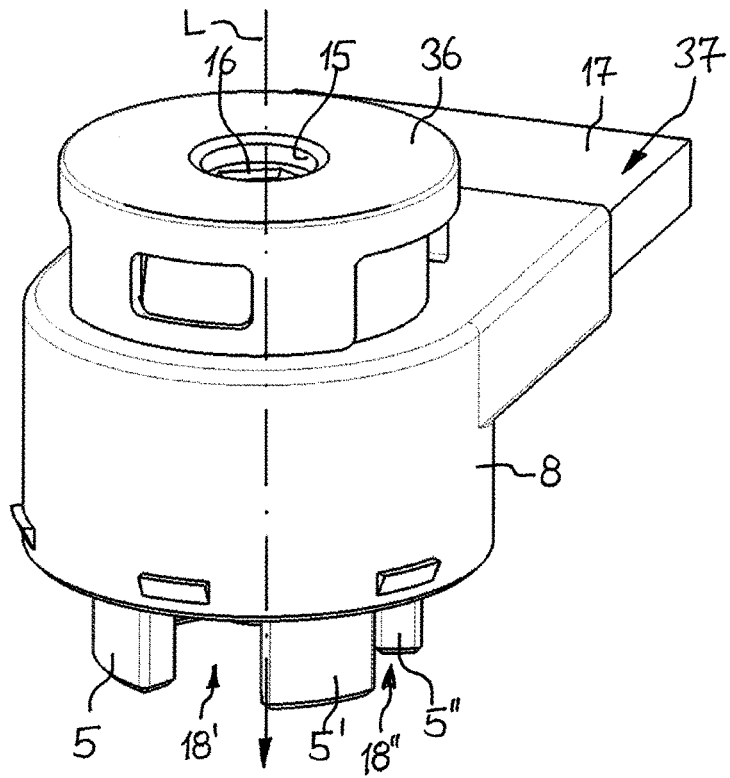
FIG. 2 is a second perspective view of the male connector according to FIG. 1.
Figure 4:
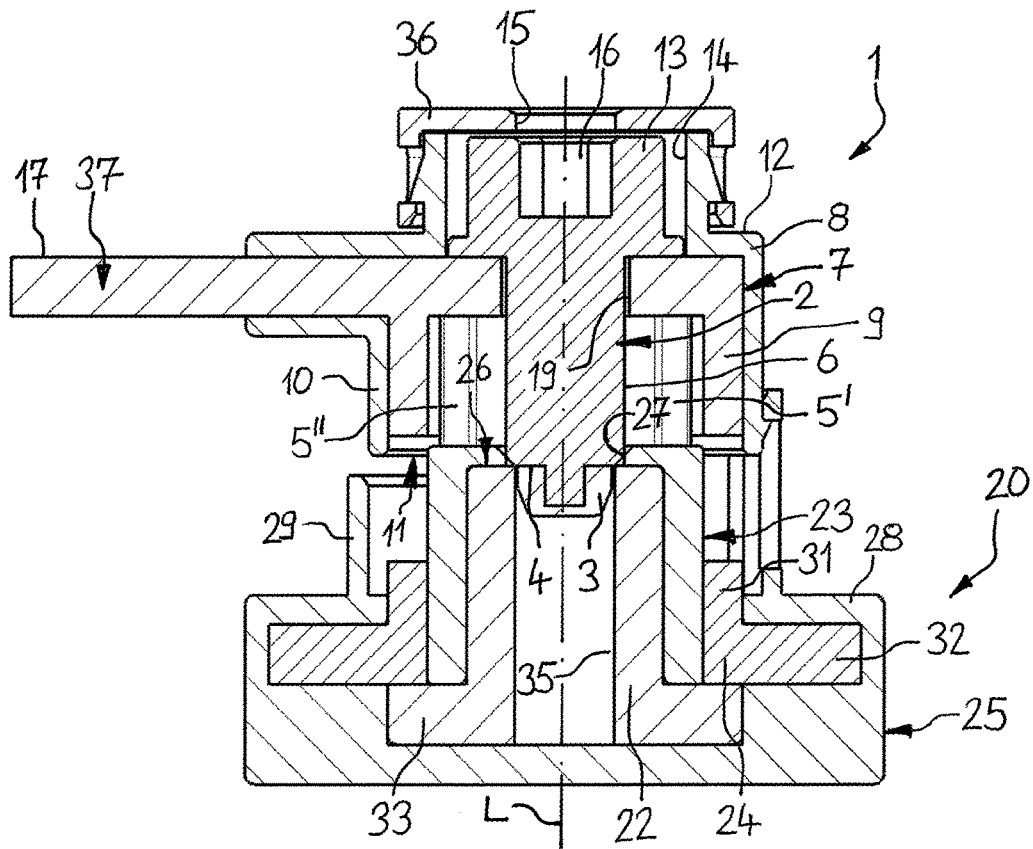
FIG. 4 is a sectional view of an electrical connection arrangement with a male connector according to FIGS. 1 and 2 and a female connector according to FIG. 3 in a pre-set position.
Figure 5:
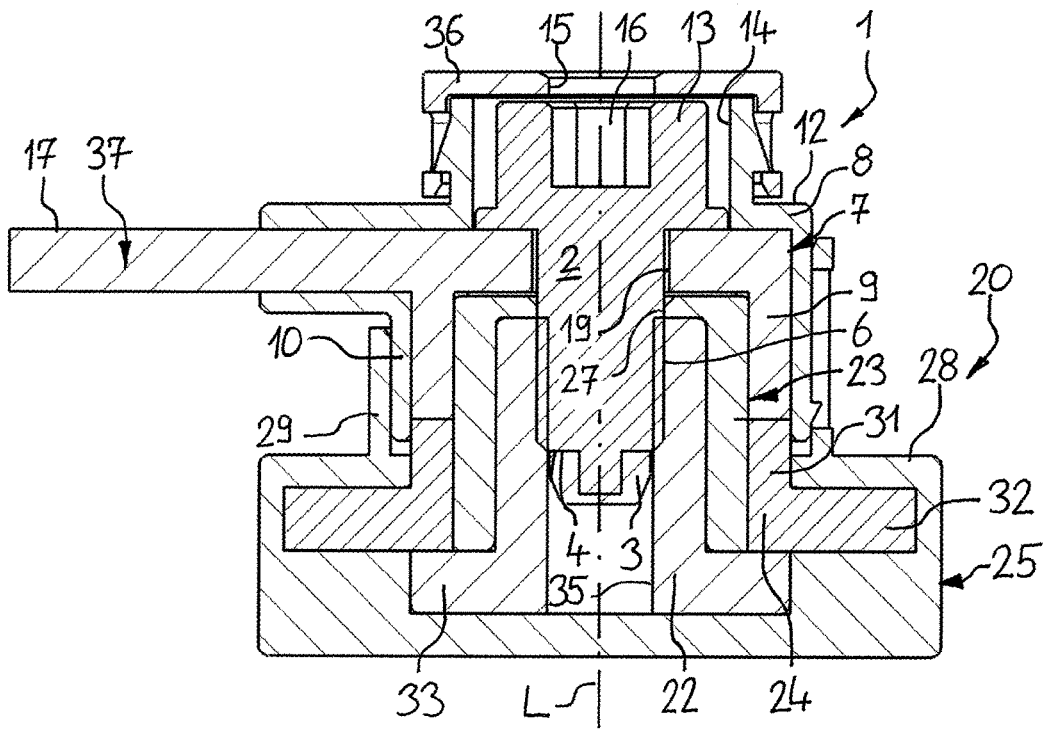
FIG. 5 is a sectional view of an electrical connection arrangement according to FIGS. 4 in a set position.

FIGS. 1 and 2 show a male connector 1 of an electrical connection arrangement as shown in FIGS. 4 and 5, wherein FIGS. 1, 2, 4 and 5 are described together. The male connector 1 has a pin element 2 arranged coaxially to a longitudinal axis L of the male connector 1 and projecting in a first mating direction M1 towards a female connector 20. The male connector 1 comprises a first protective cover 3 which is arranged on the pin element 2 and which covers at least a free axial tip end 4 of the pin element. In the disclosed embodiment the first protective cover 3 covers the free axial tip end 4 of the pin element 2 so that the tip end 4 is protected against a contact in a direction along the longitudinal axis L. The pin element 2 is made of a conductive material in order to establish an electrical connection between the pin element and a counter element (female connector which is described later) of the female connector 20. The first protective cover 3 is made of an electrically insulating material such as synthetic resin, which can be molded onto the tip end 4. The first protective cover 3 may be alternatively connected to the tip end 4 by any other well-known method such as by adhesive bonding, screwing and the like.

The male connector 1 further comprises four elongated protective elements 5, 5', 5", 5''' which are arranged parallel to the longitudinal axis L and which surround the pin element 4 in a radial distance thereto. The male connector 1 can be provided with any desired number of protective elements, wherein preferably at least two protective elements are provided. The protective elements 5, 5', 5", 5''' are evenly distributed in a circumferential direction around the pin element 2 wherein the protective elements 5, 5', 5", 5''' cover or surround the pin element 2 partially such that they leave open first slots 18, 18', 18", 18'''. Each first slot 18, 18', 18", 18''' is arranged between two adjacent protective elements 5, 5', 5", 5''' and extents parallel to the longitudinal axis L.

The pin element 2 has an outer thread 6 so that it can be threaded into an element of the female connector 20, as explained later.

In the shown exemplary embodiment, the male connector 1 further comprises a first contact element 7 made of an electrically conductive material such as a metal material. The first contact element 7 is in electrical contact to the pin element 2 establishing an electrical connection between the pin element 2 and the first contact element 7. The first contact element 7 has a first sleeve portion 9 which is formed cylindrically coaxially to the longitudinal axis L. The first sleeve portion 9 is arranged around the pin element 2 in a radial distance thereto. The protective elements 5, 5', 5", 5''' are arranged between the first sleeve portion 9 and the pin element 2.

Alternatively, the male connector 1 may be provided without the first contact element 7 so that the electric connection between the male connector 1 and the female connector 20 is established only via the pin element 2.

The male connector 1 further comprises a first protective housing 8 covering the pin elements 2 and the first contact element 7 wherein the protective elements 5, 5', 5", 5''' are part of the first protective housing 8.

The first protective housing 8 has a first base portion 12 and a first collar portion 10 which first collar portion 10 extents from the first base portion 12 parallel to the longitudinal axis L. The first collar portion 10 is formed substantially cylindrical arranged coaxially to the longitudinal axis L and the pin element 2 and surrounding the first sleeve portion 9 of the first contact element 7, the protective elements 5, 5', 5", 5''' and the pin element 2.

The first collar portion 10 forms a first opening 11 which opens towards the female connector 20. The first sleeve portion 9 of the first contact element 7 is, in axial direction, set back relative to the first opening 11 such that the first contact element 7 is completely accommodated within the first protective housing 8. In contrast to that, the pin element 2 and the protective elements 5, 5', 5", 5''' project out of the opening 11 of the first collar portion 10. Alternatively, the pin element 2 and the protective elements 5, 5', 5", 5''' may also be accommodated completely in axial direction within the first collar portion 10.

The first protective housing 8 is made of an electrically insulating material, such as a synthetic resin.

The pin element 2 is formed screw-like with a head portion 13 accommodated within a receiving chamber 14 of the first protective housing 8. The receiving chamber 14 of the first protective housing 8 is closed by a cap 36 with a tool opening 15 reaching into the receiving chamber 14 so that a tool, such as an Allen key, can be passed through the tool opening 15 fitting into a hexagon socket 16 in the head portion 13 of the pin element 2. The pin element 2 reaches through a central bore 19 of the first contact element 7 wherein the outer thread 6 of the pin element 2 and the head portion 13 are arranged on opposite sides of the first contact element 7. By way of the tool the pin element 2 can be screwed in a direction around the longitudinal axis L relative to the first contact element 7 and relative to the first protective housing 8.

In the embodiment according to the Figures the first contact element 7 is integral with a connection portion 35 of a male connector busbar 17. Alternatively, the first contact element 7 can be a separate element from the male connector busbar 17 and can be in electrical contact to the male connector busbar 17.

Figure 3:
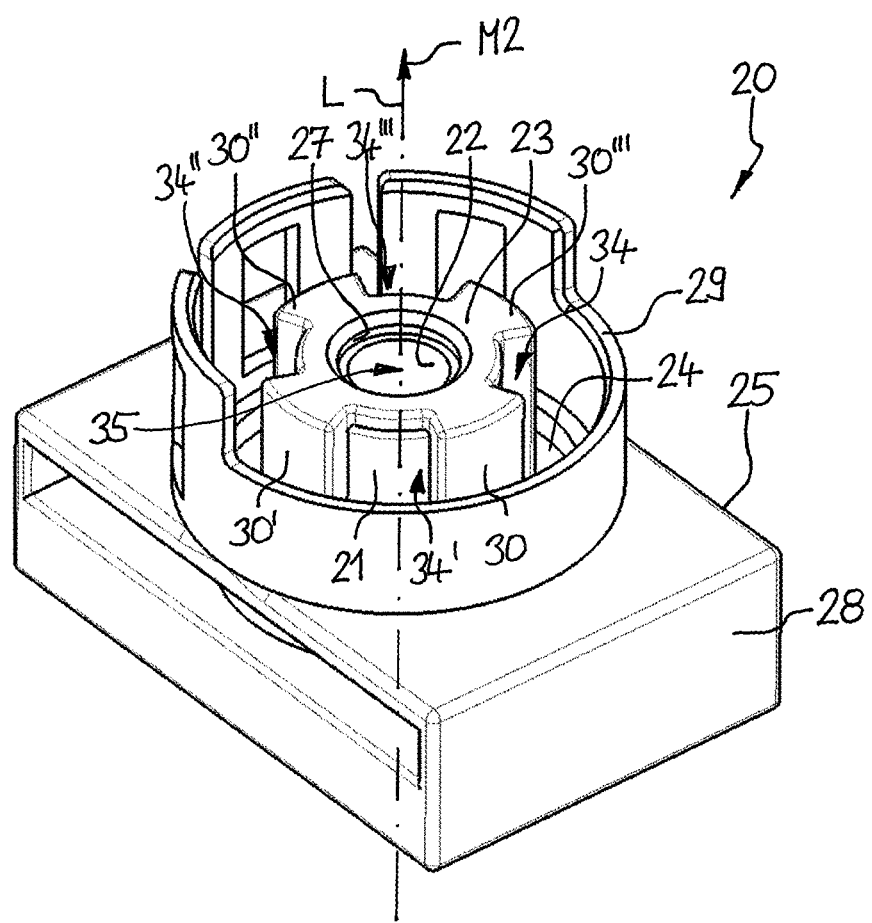
FIG. 3 is a perspective view of a female connector.

FIGS. 3, 4 and 5 show a female connector 20 to be connected with the male connector 1 according to FIGS. 1 and 2. The female connector 20 is described referring to FIGS. 3, 4 and 5.

The female connector 20 has a nut element 21 with a central threaded bore 22. The nut element 21 extends along the longitudinal axis L in a second mating direction M2 of the female connector 20 towards the male connector 1. The first mating direction M1 of the male connector 1 and the second mating direction M2 of the female connector 20 are directed opposite to each other.

The nut element is to be connected with the pin element 2 in order to establish an electrical connection between the pin element 2 and the nut element 21. Therefore, the nut element 21 is made of an electrically conductive material, such as a metal material.

The female connector 20 further comprises a second protective cover 23 which covers a free axial tip end 26 of the nut element 21. The second protective cover 23 is made of an electrically insulating material, such as a synthetic resin, and can be molded onto the nut element 21. The second protective cover 23 has an opening 27 which is aligned with the central threaded bore 22 so that the pin element 2 can be threaded into the threaded bore 22. The opening 27 of the second protective cover 23 has a size that a person cannot reach through the opening 27 and cannot reach the nut element 21 with a finger.

The female connector 20 further comprises a second contact element 24 which is held in electrical contact to the nut element 21 and which is also made of an electrically conductive material, such as metal material. The second contact element 24 and/or the nut element 21 can also be in electrical contact to a female connector busbar (not shown). Alternatively, the second contact element 24 and/or the nut element 21 can be integral with the female connector busbar.

The female connector 20 has a second protective housing 25. The second protective housing 25 has a second base portion 28 and a second collar portion 29 wherein the second collar portion 29 projects from the second base portion 28 in a longitudinal direction along the longitudinal axis L towards the male connector 1. The second collar portion 29 accommodates the nut element 21 and the second protective cover 23 as well as the second contact element 24. At least a part of the circumference of the second collar portion 29 projects farther in the direction towards the male connector 1 than the nut element 21, the second protective cover 23 and the second contact element 24.

The second contact element 24 has a second sleeve portion 31 which is arranged coaxially to the longitudinal axis L surrounding the nut element 21 and the second protective cover 23. The second contact element 24 further has a flange portion 32 which is in contact to a flange portion 33 of the nut element 21. The flange portion 33 of the nut element 21 is arranged on the opposite side of the flange portion 32 of the second contact element 24 and the male connector 1.

The second protective cover 23 comprises four ribs 30, 30', 30", 30''' which extend parallel to the longitudinal axis L and which are distributed around the longitudinal axis L evenly around the nut element 21 and which are integral with a portion of the second protective cover 23 which forms the opening 27. The second protective cover 23 can be provided with any desired number of ribs, wherein the number of ribs 30, 30', 30", 30''' should correspond to the number of protective elements 5, 5', 5", 5'''.

Between each pair of adjacent ribs 30, 30', 30", 30''' a second slot 34, 34', 34", 34''' is formed.

The mating of the male connector 1 with the female connector 20 is now described with reference to FIGS. 4 and 5. In a first step, the male connector 1 and the female connector 20 can be brought in a pre-set position to each other, establishing a preset condition of the electrical connection arrangement comprising the male connector 1 and the female connector 20. In the pre-set position the first protective cover 3 is axially supported against the nut element 21 wherein the outer diameter of the first protective cover 3 is larger than the smallest inner diameter of the threaded bore 22 of the nut element 21. The ribs 30, 30', 30", 30''' of the second protective cover 23 are axially partially engaged into the first slots 18, 18', 18", 18''' between the protective elements 5, 5', 5", 5'''. The ribs of the first slots 18, 18', 18", 18''' are adapted to the width of the ribs 30, 30', 30", 30''' in circumferential direction. Further, the protective elements 5, 5', 5", 5''' are partially engaged into the second slots 34, 34', 34", 34'''. Also, the width in circumferential direction of the protective elements 5, 5', 5", 5''' are adapted to the width in circumferential direction of the second slots 34, 34', 34", 34'''.

The pin element 2 is not in contact to the nut element 21. Further, the first contact element 7 is remote from the second contact element 24 so that no electrical connection between the male connector 1 and the female connector 20 is established.

For further mating the male connector 1 and the female connector 20 the pin element 2 is screwed into the central threaded bore 22 of the nut element 21. When threading the pin element 2 into the threaded bore 22 the inner thread 35 of the threaded bore 22 cuts into the material of the first protective cover 3.

When fully mated, the ribs 30, 30', 30", 30''' engage into the first slots 18, 18', 18", 18''' as much as possible as well as the protective elements 5, 5', 5", 5''' into the second slots 34, 34', 34". The head portion 13 of the pin element 2 pushes the first contact element 7 in contact to the second contact element 24 establishing an electrical connection between the first contact element 7 and the second contact element 24. The second contact element 24 is supported against the flange portion 33 of the nut element 21. Hence, the first contact element 7 and the second contact element 24 are clamped between the head portion 13 of the pin element 2 and the flange portion 33 of the nut element 21.

Further, an electrical connection is established between the pin element 2 and the nut element 21.

The first collar portion 10 of the first protective housing 8 is inserted into the second collar portion 29 of the second protective housing 25 so that the contact elements 7, 24 are completely covered by the first protective housing 8 and the second protective housing 25, so that it is avoided that a person may touch one of the electrically conductive elements.

During unmating the male connector 1 and the female connector 20, the pin element 2 is screwed out of the threaded bore 22 of the nut element 21. The head portion 13 of the pin element 2 is axially supported against the cap 36 of the receiving chamber 14 so that the nut element 21 pushes the first protective housing 8 out of the second protective housing 25, wherein the cap 36 is secures to the first protective housing 8 by a click-on connection.

REFERENCE NUMERALS 1 male connector
2 pin element
3 first protective cover
4 tip end of pin element
5, 5', 5", 5''' protective element
6 outer thread
7 first contact element
8 first protective housing
9 first sleeve portion
10 first collar portion
11 first opening
12 first base portion
13 head portion
14 receiving chamber
15 tool opening
16 hexagon socket
17 male connector busbar
18, 18', 18", 18''' first slot
19 central bore
20 female connector
21 nut element
22 central threaded bore
23 second protective cover
24 second contact element
25 second protective housing
26 tip end of the nut element
27 opening of second protective cover
28 second base portion
29 second collar portion
30, 30', 30", 30''' rib
31 second sleeve portion
32 flange portion of second contact element
33 flange portion of nut element
34, 34', 34", 34''' second slot
35 inner thread
36 cap
37 connection portion of male connector busbar
L longitudinal axis
M1 first mating direction
M2 second mating direction

The invention claimed is:

1. Electrical connection arrangement comprising
a male connector and a female connector both to be mated in mating directions along a longitudinal axis,
the male connector comprises
a pin element projecting in a first mating direction towards the female connector,
a first protective cover on the pin element covering at least a free axial tip end of the pin element, and
at least one protective element surrounding, at least partially, the pin element in a radial distance thereto,
wherein the female connector comprises
a nut element with a central threaded bore, said nut element projects in a second mating direction towards the male connector, and
a second protective cover on the nut element covering a free axial tip end of the nut element, and
wherein the pin element has an outer thread and is threaded into the threaded bore of the nut element in a mated condition of the electrical connection arrangement establishing an electrical connection between the pin element and the nut element.

2. Electrical connection arrangement according to claim 1,
wherein the male connector comprises a first contact element in electrical contact to the pin element and the female connector comprises a second contact element in electrical contact to the nut element,
wherein in a mated condition of the electrical connection arrangement the first contact element and the second contact element are in electrical contact to each other.

3. Electrical connection arrangement according to claim 2,
wherein the male connector comprises a first protective housing accommodating the pin element and the first contact element.

4. Electrical connection arrangement according to claim 2,
wherein the female connector comprises a second protective housing accommodating the nut element and the second contact element.

5. Electrical connection arrangement according to claim 1,
wherein the threaded bore of the nut element opens into the free tip end of the nut element and the second protective cover has an opening aligned with the threaded bore.

6. Electrical connection arrangement according to claim 1,
wherein the pin element is arranged axially offset in a backward direction relative to the at least one protective element.

7. Electrical connection arrangement according to claim 2,
wherein the first protective housing has a first base portion and a first collar portion, wherein said first collar portion projects from the first base portion in longitudinal direction farther than the first contact element.

8. Electrical connection arrangement according to claim 7,
wherein the first base portion accommodates a connection portion of a male connector busbar and the pin element is axially supported against the connection portion of the male connector busbar.

9. Electrical connection arrangement according to claim 7,
wherein the pin element has a head portion received within a receiving chamber of the first protective housing wherein the first protective housing has a tool opening for inserting a tool to reach the head portion.

10. Electrical connection arrangement according to claim 1,
wherein the second protective housing has a second base portion and a second collar portion, wherein said second collar portion projects, at least partially in circumferential direction, from the second base portion in longitudinal direction farther than the nut element.

11. Electrical connection arrangement according to claim 10,
wherein the second base portion accommodates a connection portion of a female connector busbar and the nut element is axially supported against the connection portion of the female connector busbar.

12. Electrical connection arrangement according to claim 1,
wherein the second protective cover has a plurality of ribs extending parallel to the longitudinal axis L partially covering the outer circumference of the nut element.

13. Electrical connection arrangement according to claim 1,
wherein a plurality of protecting elements is provided distributed around the pin element and arranged parallel to the pin element.

14. Electrical connection arrangement according to claim 12,
wherein in a pre-set condition of the electrical connection arrangement
the ribs of the second protective cover are axially engaging into first slots formed between the protective elements,
the first contact element is distanced from the second contact element and
the first protective cover on the pin element is in insulating contact to the tip end of the nut element.

15. Electrical connection arrangement according to claim 14,
wherein in a fully mated condition of the electrical connection arrangement
the ribs of the second protective cover are axially engaging into first slots formed between the protective elements,
the first contact element is in electrical contact to the second contact element and
the pin element is threaded into the central thread of the nut element.

* * * * *